United States Patent
Samudrala et al.

(10) Patent No.: US 7,634,322 B2
(45) Date of Patent: Dec. 15, 2009

(54) CONFIGURATION OF WIRELESS FIELD DEVICES FOR PROCESS CONTROL PLANTS

(75) Inventors: Prasad Samudrala, Bangalore (IN); Deepak Tanajirao Patil, II, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 11/690,154

(22) Filed: Mar. 23, 2007

(65) Prior Publication Data

US 2008/0234837 A1     Sep. 25, 2008

(51) Int. Cl.
*G05B 11/01* (2006.01)
*G05B 15/00* (2006.01)

(52) U.S. Cl. .......................................... 700/17; 700/83
(58) Field of Classification Search ............. 700/17–20, 700/83
See application file for complete search history.

(56) References Cited

U.S. PATENT DOCUMENTS

| | | | | |
|---|---|---|---|---|
| 5,970,430 | A * | 10/1999 | Burns et al. | 702/122 |
| 5,980,078 | A * | 11/1999 | Krivoshein et al. | 700/1 |
| 7,010,294 | B1 * | 3/2006 | Pyotsia et al. | 455/420 |
| 7,058,542 | B2 * | 6/2006 | Hauhia et al. | 702/183 |
| 2004/0230328 | A1 * | 11/2004 | Armstrong et al. | 700/83 |
| 2004/0259533 | A1 * | 12/2004 | Nixon et al. | 455/414.1 |
| 2006/0092039 | A1 * | 5/2006 | Saito et al. | 340/825.37 |
| 2006/0200256 | A1 * | 9/2006 | Mason et al. | 700/65 |
| 2007/0161352 | A1 * | 7/2007 | Dobrowski et al. | 455/69 |
| 2007/0243830 | A1 * | 10/2007 | Isenmann et al. | 455/67.11 |
| 2007/0270177 | A1 * | 11/2007 | Nagashima et al. | 455/550.1 |

FOREIGN PATENT DOCUMENTS

| | | |
|---|---|---|
| DE | 20103982 U1 | 6/2001 |
| DE | 102004002330 A1 | 8/2005 |
| EP | 1486841 A1 | 12/2004 |
| WO | WO 2004/047043 A2 | 6/2004 |

* cited by examiner

*Primary Examiner*—Ronald D Hartman, Jr.
(74) *Attorney, Agent, or Firm*—Naren Thappeta (57) ABSTRACT

Wireless field devices used in process control plants are configured over a wireless medium. In an embodiment, a host device discovers the presence of wireless field devices in the vicinity, and displays a list of discovered devices. The host device then enables a user to select a field device for configuration from the displayed list, and causes only the selected wireless field device to generate a human perceivable signal, thereby enabling a user to correlate a wireless field device listed in the display with the actual physical field device present in the vicinity. Upon confirmation from the user that the selected wireless field device is the device intended for configuration, the host device transmits the corresponding configuration parameters over the wireless medium, thus configuring the device.

13 Claims, 6 Drawing Sheets

CONFIGURATION OF WIRELESS FIELD DEVICES FOR PROCESS CONTROL PLANTS

BACKGROUND

1. Technical Field

The present disclosure relates generally to process control systems and more specifically to a technique of configuring wireless field devices for process control plants.

2. Related Art

A process control plant generally contains several equipment (e.g., boilers, filters, furnaces, coolers, etc.), which are used to implement a desired control process (e.g., oil refinery, manufacturing operation, etc.). Each equipment in turn generally includes devices (often called field devices as they may be deployed in a decentralized manner 'in the field') such as actuators (such as valves and switches) and sensors, which are specifically operable facilitating various manufacturing objectives.

For example, a temperature sensor may be deployed as a field device to take measurements of a boiler and provide the measurements back to a control station controlling the operation of the process control plant. As field devices are often physically located far from the control station, they may be implemented as wireless devices (which communicate on wireless paths). By providing wireless communication path, wired paths may potentially be avoided (or complemented with wire-based paths for redundancy), thereby simplifying the deployment and management of process control plants.

There is often a need to configure wireless field devices. For example, each device may need to be configured consistent with control strategies sought to be implemented in conjunction with the control stations. For example, a temperature sensor may be required to take temperature measurements at regular time intervals or at the end of some event such as a change in the pressure inside a boiler, and provide the information to another element which acts upon the information.

Therefore, such information (duration of time interval, or a critical pressure value inside the boiler) may be provided to the temperature sensor consistent with a corresponding control strategy. The wireless field devices may need to be configured with other information (such as identifiers/names, etc.)

BRIEF DESCRIPTION OF THE DRAWINGS

Example embodiments will be described with reference to the accompanying drawings, which are described below briefly.

FIG. (FIG.) 1 is a block diagram illustrating the details of an example process control environment in which several aspects of the present invention can be implemented.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention enables configuration of wireless field devices used in process control plants from a host device over a wireless medium. In an embodiment, the host device, placed within a range of communication of one or more wireless field devices, discovers the presence of wireless field devices, and displays a list of the discovered devices in a display unit. A user may then cause the host device to issue configuration commands to cause the field device to be configured.

The host device is used outside of a process control plant and thus provides a convenient mechanism by which the wireless field devices can be (at least partially) configured prior to being installed in a plant later.

Another aspect of the present invention enables a user to correlate each of a list of displayed wireless field devices with the corresponding field devices present in the vicinity. A user may select one of the field devices and signals are generated from the host device to cause (only) the corresponding field device to generate human perceivable signal (e.g., blinking light).

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the invention.

2. Process Control Environment

Figure 1:
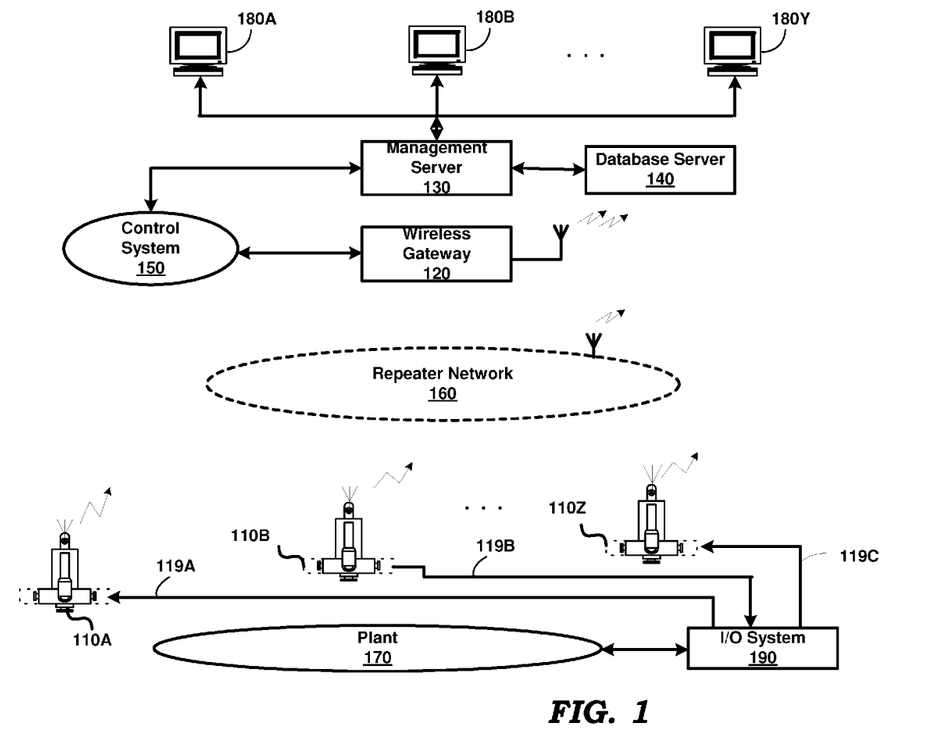

FIG. 1 is a block diagram of an example process control environment in which several aspects of the present invention may be implemented. The diagram is shown containing wireless field devices 110A through 110Z, wireless gateway 120, management server 130, database server 140, control system 150, repeater network 160, plant 170, operator terminals 180A through 180Y, and I/O system 190. Merely for illustration, only representative number/type of components are shown. However, typical environments contain many more components. For example, some or all of the field devices may be connected by wire-based paths as well. Each component is described in detail below.

Plant 170 represents a process control plant whose operation is to be controlled. Plant 170 may contain equipment such as boilers, filters, furnace, cooler etc. Though shown separated from wireless field devices 110A-110Z, the equipment and the devices are generally integrated with the equipment in the plant.

Wireless gateway 120 receives commands from control system 150, and transmits the commands over a wireless medium to wireless field devices 110A-110Z via repeater network 160. Similarly, wireless gateway 120 receives process values (such as noted above) from wireless field devices 110A-110Z over the wireless medium via repeater network 160, and provides them to control system 150.

Repeater network 160 may contain one or more wireless repeaters which operate as intermediary nodes in the communication path between wireless gateway 120 and wireless field devices 110A-110Z. Wireless gateway 160 and repeater network 160 may be implemented in a known way.

Operator terminals 180A_180Y provide a suitable user interface using which an operator can manage/monitor the various equipment in plant 170 via wireless field devices 110A-110Z. In general, an operator may cause issuance of management commands to plant 170 and wireless field devices 110A-110Z using one or more of operator terminals 180A_180Y or control server 130.

Database server 140 may store various control strategies to control the operation of plant 170 according to a desired objective, which can be loaded into control server 140 after any necessary changes. Thus, database server 140 may include information on the parameters to be configured on wireless field devices 110A-110Z.

Management server 130 receives various interface commands (either from operator stations 180A_180Y or from an operator directly from keyboards, not shown) and generates corresponding management commands for controlling the operation of plant 170. Management server 150 provides appropriate data for incorporation into various screens displayed at control terminals 180A_180Y. The data may be formed from local data (stored with the management server), from database server 170, from plant 170 received via wireless field devices 110A_110Z. In addition, management server 130 may retrieve various control strategies from database server 170 and load the retrieved strategies into control system 150 upon corresponding commands from operator terminals 180A_180Y.

Control system 150 generates control commands according to pre-loaded control strategies to control the operation of wireless field devices 110A_110Z. The control strategies generally have predefined computational sequences on variables representing states of one or more processes in plant 170. The execution of a control strategy entails performing such computational sequences using (input) values for input variables as well as various other preset parameters for respective variables. Though the control strategies are described as being implemented centrally in control system 150 for ease of understanding, it should be appreciated that some of the strategies can be implemented in a more distributed manner (e.g., in field devices themselves).

Wireless field devices 110A-110Z represent field devices (such as temperature sensors, pressure sensors, actuators etc) used for monitoring/controlling the operation of plant 170, and operate according to control commands received from control system 150. In an embodiment, wireless field devices 110A-110Z provide process values (e.g., temperature, pressure etc of various equipment in plant 170) to control system 150 or accept output values (to control output devices such as actuators in plant 170) from control system 150. The setting or acceptance of output values may cause the desired operation of the corresponding equipment.

It may be appreciated that at least some of the aspects (usually in the form of parameter values) of the wireless field devices may be configured once installed in plant 170. However, there is a general need to configure the devices external to the plant prior to installation in the plant, by developers during development phase of the wireless field devices, etc. Various aspects of the present invention enable such configuration as described below in further detail.

3. Field Device Configuration

Figure 2:
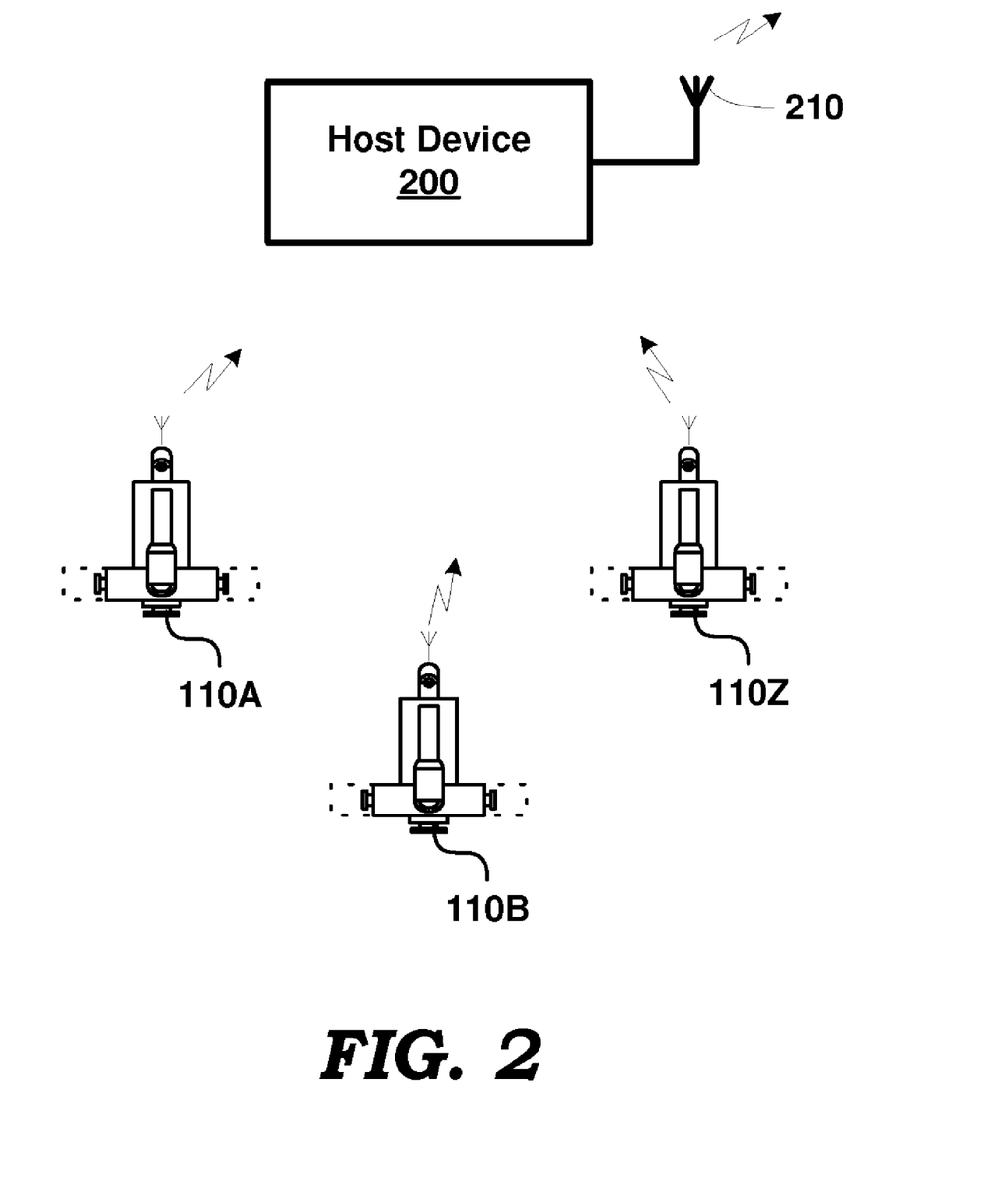
FIG. 2 is a block diagram illustrating the manner in which wireless field devices can be configured according to an aspect of the present invention.

FIG. 2 is a block diagram illustrating the manner in which wireless field devices 110A-110Z can be configured according to an aspect of the present invention. The diagram is shown containing host device 200, and wireless field devices 110A-110Z. Though the field devices are shown with the same reference numerals as in FIG. 1, it should be appreciated that the scenario of FIG. 2 is outside of process control plant (operational environment).

Host device 200 may be pre-loaded with configuration data indicating the manner in which wireless field devices 110A-110Z need to be configured. The data may thus indicate desired control strategies for plant 170 (FIG. 1). The configuration data may be generated, for example, in control system 150 (FIG. 1), and loaded onto host device 200 via a suitable interface such as a serial port or USB port, well known in the relevant arts. Alternatively, the configuration data may be generated in host device 200 itself.

Host device 200 then uses a wireless path to configure each of the field devices 110A-110Z according to an aspect of the present invention, as described in sections below. As shown in FIG. 2, the wireless path spans the entire path between each field device and the host device since both ends use the wireless medium. Host device 200 may be implemented, for example, either as a hand-held, battery operated device, or general-purpose computer, and the details of host device 200 in an embodiment are described next.

4. Host Device

Figure 3A:
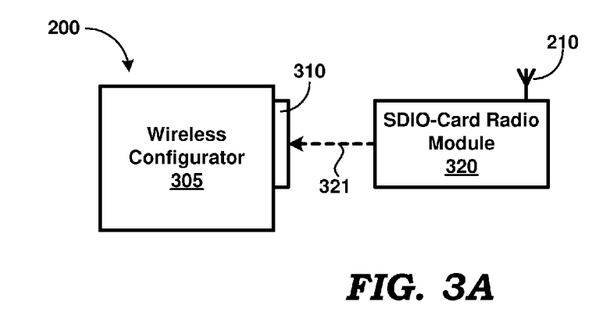
FIG. 3A is a block diagram illustrating the details of a wireless configurator in one embodiment.
Figure 3B:
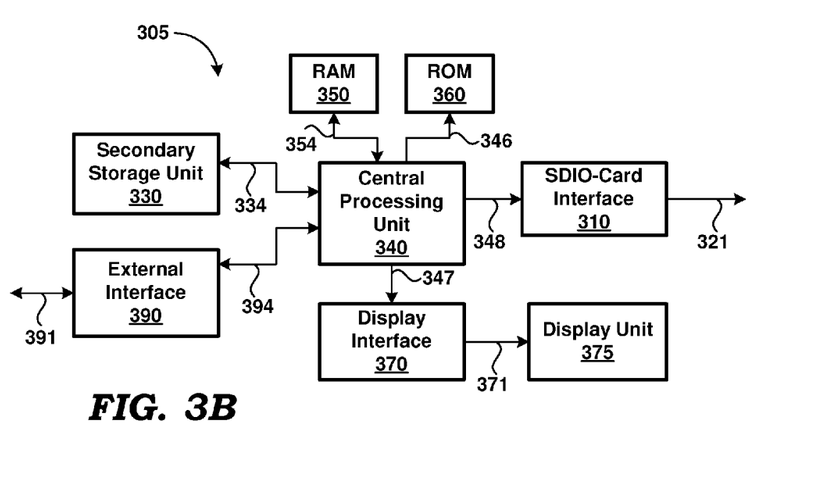
FIG. 3B is a block diagram illustrating the details of a host device which configures wireless field devices in one embodiment.

FIGS. 3A and 3B are block diagrams illustrating the internal details of a host device used to configure wireless field devices in one embodiment. Host device 200 is shown containing wireless configurator 305, SDIO card interface 310, and SDIO card radio module 320. Each component is described below in further detail.

SDIO card radio module 320 implements the radio communication operations required to communicate wirelessly. One of several commercially available pluggable SDIO cards may be used to implement SD-card radio module 320 confirming to the SD (Secure Digital) card standard. SD card standard is described in documents entitled, "SD Specifications: Part E1: SDIO Simplified Specification, Version 2.00, dated Feb. 8, 2007" and "SD Specifications: Part 1: Physical Layer Simplified Specification: Version 2.00: dated Sep. 25, 2006", available from SD Card Association, 2400 Camino Ramon, Suite 375, San Ramon, Calif. 94583 Tel: (925) 275-6687.

While the description is provided with respect to radio communications merely for illustration, other wireless forms (e.g., infrared) and corresponding wireless interfaces (e.g., including antenna 210 in case of radio communication) can also be used for configuration, without departing from the scope and spirit of several aspects of the present invention.

Wireless configurator 305 is shown containing SDIO (Secure Digital Input Output card) interface 310 to which SDIO card radio module 320 may be connected (for example, as a plug-in card). Wireless configurator 305 may be implemented to generate various configuration commands on wireless path. Wireless configuration 305 may be implemented in one of various ways.

FIG. 3B shows the internal details of wireless configurator 305 in one embodiment. Wireless configurator 305 is shown containing secondary storage unit 330, central processing unit (CPU) 340, RAM 350, ROM 360, display interface 370, display unit 375, SD-card interface 310 and external interface 390.

External interface 390 may include input interfaces such as keyboard/mouse for an operator/technician to operate wireless configurator 305 (and thus host device 200). External interface 390 may also include I/O interfaces such as a serial port interface and/or USB (universal serial bus interface) for communicating with an external device. Configuration data for wireless field devices 110A-110Z may be stored in host device 200 via external interface 390 and path 391. CPU 340 communicates with external interface 390 via path 394.

Display interface 370 provides display signals (e.g., in RGB format) to display unit 375 via path 371, based on data/instructions received from CPU 340. Display unit 375 displays various messages and screens to enable an operator/technician to interact with host device 200. In an embodiment, display unit 375 is implemented as an LCD unit.

RAM 350 may receive instructions from secondary storage unit 330 via CPU 340, and may store temporary data generated during the operation of host device 200. ROM 360 may store data and software instructions (code) which may be executed by CPU 340. Alternatively, data and instructions may be copied to RAM 350 from which CPU 340 may execute. CPU 340 stores/retrieves instructions/data from RAM 350 and ROM 360 via paths 356 and 346 respectively. Groups of software instructions (for example, in compiled/object form or post-linking in a form suitable for execution by CPU 340) are termed as code.

Secondary storage unit 330 may contain hard drive, flash memory, and removable storage drive. Some or all of the data and instructions may also be provided on secondary storage unit 330, and read and executed by CPU 910. Removable storage drive in secondary storage unit 330 may be in the form of floppy drive, magnetic tape drive, CD-ROM drive, DVD Drive, Flash memory, removable memory chip (PCMCIA Card, EPROM) etc. CPU 340 stores/retrieves instructions/data from secondary storage unit 330 via path 334.

In general, a computer (or in general machine) readable medium refers to any medium from which processors can read and execute instructions. The medium can be randomly accessed (such as RAM 350 or ROM 360), volatile, non-volatile, removable or non-removable, etc.

CPU 340 may execute instructions stored in RAM 350 or ROM 360 to provide several features of the present invention described below. CPU 340 may contain multiple processing units, with each processing unit potentially being designed for a specific task. Alternatively, CPU 340 may contain only a single general purpose processing unit.

SDIO card interface 310 may be implemented consistent with the SDIO card standard and provides an interface for connecting SDIO card radio module 320 (FIG. 3A). SDIO card interface 310 may receive configuration data for field devices from CPU 340 via path 348, and provide the data to SD-card radio module 320, which transmits the data wirelessly to the field devices.

The manner in which wireless configurator 305 configures field devices 110A-110Z is described next with respect to a flowchart. The software instructions noted above may need to be appropriately designed accordingly.

5. Configuring Wireless Field Devices

Figure 4:
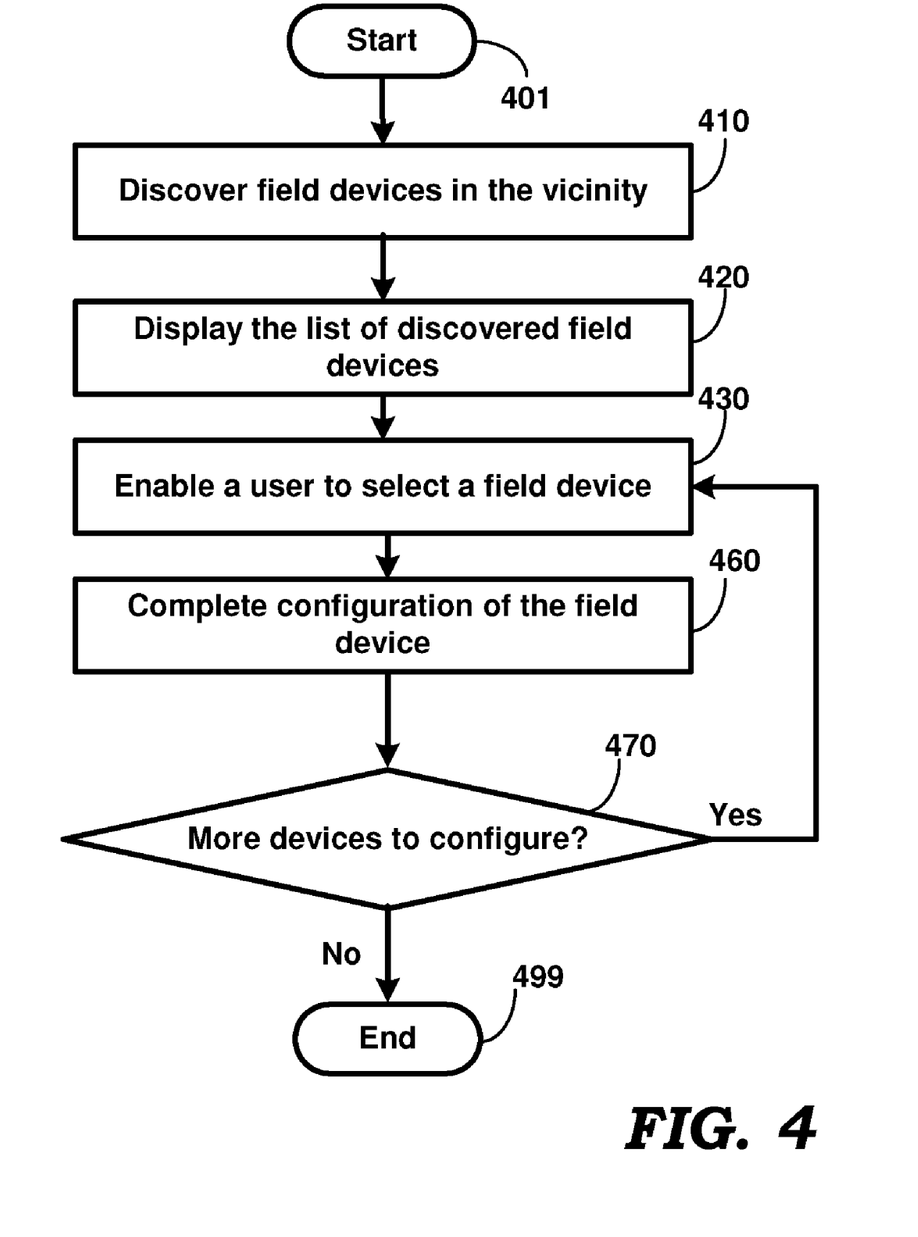
FIG. 4 is a flowchart illustrating the manner in which a host device configures field devices according to an aspect of the present invention.

FIG. 4 is a flowchart illustrating the manner in which wireless field devices may be configured according to an aspect of the present invention. The flowchart is described with respect to FIGS. 2, 3A and 3B, and in relation to wireless configurator 305, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 401, in which control passes immediately to step 410.

In step 410, wireless configurator 305 discovers wireless field devices in the vicinity. In general the range of vicinity is determined by the strength of the wireless signals between wireless configurator 305 and the field devices. The discovery generally entails a communication, which identifies the field devices and wireless configurator 305 recognizing the devices. Thus, at the end of discovery, wireless configurator 305 may have information indicating the address (or other identifier) using which each field device can be contacted.

In step 420, wireless configurator 305 displays a list of discovered wireless field devices. In an embodiment, wireless configurator 305 displays a device tag, device type, the assigned address, etc., on display unit 375. Such information may be obtained by querying the subject wireless field devices according to a pre-specified convention (e.g., each parameter value of interest may be pre-specified by a parameter identifier). Control then passes to step 430.

In step 430, wireless configurator 300, enables a user to select a field device using the displayed list. If the user wishes to correlate the selected field device with the specific field device in the vicinity (or wishes to select a specific one of the field devices in the vicinity), the approach of FIG. 5 described below, can be used. Control then passes to step 460.

In step 460, wireless configurator 305 configures the selected wireless field device with the corresponding configuration parameters. The configuration parameters are pre-loaded in wireless configurator 305, and depend in general on the desired control strategy to be implemented for plant 170 (FIG. 1) using the presently selected field device. Merely as examples, configuration of the wireless device parameters may include changing the type of sensor (assuming a wireless field device has multiple sensors), changing the frequency with which the sensor records the values of a process variable (e.g., temperature), selecting a unit in which to store the measured values of process variables, setting of alarms and events, changing a transducer block into operation mode from out-of-service (OOS) mode (and vice versa), write-protecting the field device, changing the wireless network parameters such as wireless network address, communication mode (e.g., frequency hopping mode) etc.

In general, configuring a wireless device entails issuing the corresponding configuration commands on the wireless path. The configuration commands may be embedded in packets transmitted over the wireless paths. Each packet may contain a destination address identifying the field device to which the commands are directed. Accordingly, each wireless field device may need to be designed to receive the packets on wireless medium, parse the packet to determine the configuration command, and change internal configuration (e.g., by setting the parameters to value specified in the command) Control then passes to step 470.

In step 470, wireless configurator 305 checks if more wireless field devices are to be configured. If a user does not indicate any other wireless field device for configuration, control passes to step 499 in which the flowchart ends, else control passes to step 430 and the configuration is repeated for another wireless device.

One problem with the approach of above is that a user may not know which field device in the display list corresponds to which field device present in the vicinity. An aspect of the present invention enables such correlation to be performed, as described below in further detail.

6. Correlating Listed Field Devices with the Physical Field Devices

Figure 5:
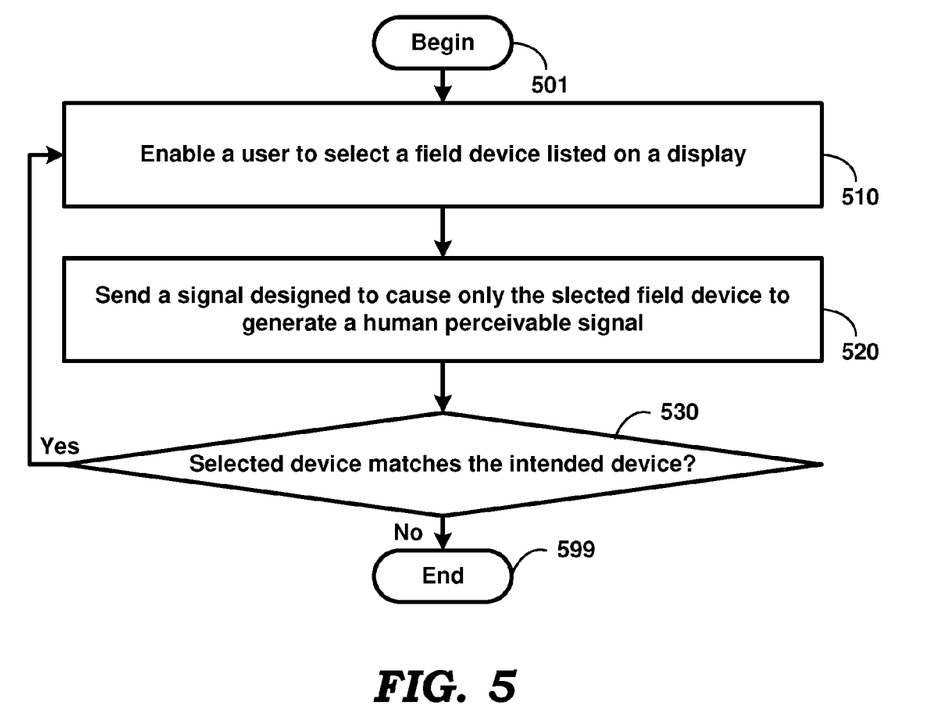
FIG. 5 is a flowchart illustrating the manner in which a user may correlate a wireless field device listed in a display with the physical field device present in the vicinity according to an aspect of the present invention.

FIG. 5 is a flowchart illustrating the manner in which a user correlates a wireless field device listed in a display with the physical field device present in the vicinity. Such correlation can be used in selecting a device of interest for immediate configuration, even though the correlation information can be used for other purposes as well, without departing from the scope and spirit of various aspects of the present invention.

In addition, the flowchart is described with respect to FIGS. 2, 3A and 3B, and in relation to wireless configurator 305, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 501, in which control passes immediately to step 510.

In step 510, wireless configurator 305 enables a user to select a field device listed on a display. As noted above, wireless configurator 305 may display a list of discovered field devices. A user may select one (or more) of the listed devices using input devices such as a keyboard/mouse, and CPU 340 may receive data indicating the specific one of the selected field devices from display. Control then passes to step 520.

In step 520, wireless configurator 305 sends a message to the selected field device, with the message being designed to cause the field device to generate a human perceivable signal. In an embodiment described below, the selected field device on receipt of the message from wireless configurator 305 lights a lamp (in the form of an LED array, for example), thus indicating that the device has been selected for configuration. However, sound/smell/touch type of other human perceivable signals can also be used instead. Control then passes to step 530.

In step 530, the user may visually ascertain if the selected field device corresponds to the field device that is to be configured. If the selected field device is the intended device, control passes to step 599 in which the flowchart ends, else control passes to step 510 in which the user may again select the correct field device for configuration.

The description is continued with example diagrams illustrating the user interface and user experience with respect to wireless configurator 305 (and host device 200) in an embodiment.

7. User Interface and User Experience

Figure 6A:
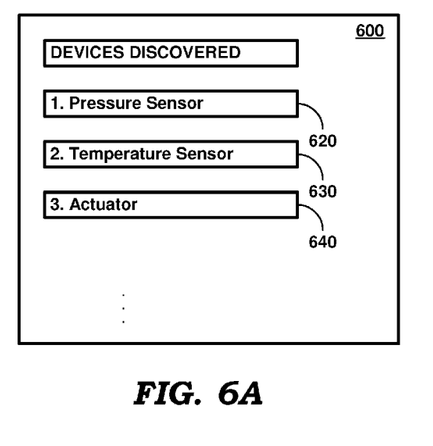
FIGS. 6A and 6B together illustrate an example user experience when a user selects a desired field device.
Figure 6B:
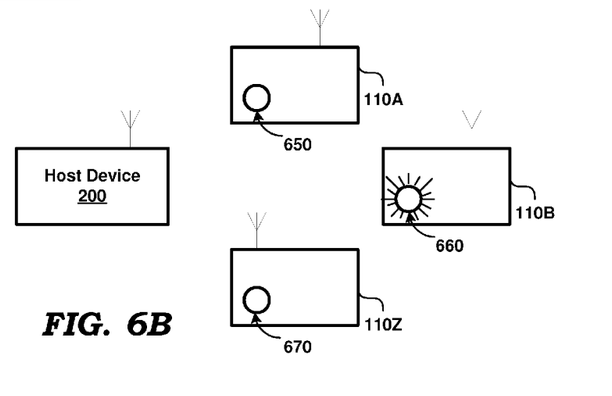

FIGS. 6A and 6B together illustrate an example user experience when a user selects a desired field device. FIG. 6B contains three field devices 110A, 110B and 110Z along with host device 200. FIG. 6A depicts a display indicating that the three devices have been discovered and displayed as pressure sensor 620, temperature sensor 630 and actuator 640. Assuming the user selected temperature sensor 630, host device 200 generates a signal which causes only the target device to blink a light as shown in with bulb 660 in field device 110B. On the other hand, bulbs 650 and 670 of field devices 110A and 110Z are not blinking, as shown.

Thus, the user may determine that temperature sensor 630 entry corresponds to field device 110B. The user may then continue with appropriate action (e.g., configuration, not shown in FIG. 6A).

It should be appreciated that the features described above may require communication to be established between host device 200 and each wireless field device 110A-110Z on wireless path. The manner in which such communication can be established is described in further detail below.

8. Establishing Communication

Establishing communication generally depends on the underlying technology, design requirements, etc. In one embodiment implemented in radio (ISM band), each field device is pre-assigned (according to a standard) a unique 64-bit address at the time of manufacture of the device.

When in the vicinity of host device 200, a clock synchronization is first achieved by having host device 200 transmit a special pattern and the field devices aligning their respective clocks with the clock of the host device.

On achieving clock synchronization with host device 200, a field device sends a request to host device 200 requesting for a time slot to be allotted/specified in which communication may take place with host device 200. The field device also sends its unique 64-bit (IEEE) address to host device 200. If a collision is sensed the field device may re-transmit the slot request after a random back-off interval. Thus, host device 200 obtains the unique 64-bit address of each of the field devices in the vicinity. Each field device may periodically broadcast its own unique address and if a collision is sensed may re-transmit the address after backing-off for a random duration (to avoid further collisions).

Once the 64-bit addresses are obtained, host device 200 maps the 64 bit address to a 16-bit address, which is communicated to the respective field device. In addition, host device 200 assigns non-overlapping time slots to the field devices, which are also communicated to respective field devices.

Each field device then sends packets in the assigned time slot, thereby establishing communication with host device 200. Host device 200 may establish a secure session with a field device before starting configuration. Host device 200 then configures each field device according to the desired control strategy and the information in the respective device description. Such configuration may be configured in a known way (for example, based on knowledge how configuration is performed using wirebased paths).

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of configuring a plurality of wireless field devices for later use in a process control plant, each of said plurality of wireless field devices accessible by a wireless medium, said method comprising:

placing a host device in a range of communication of said plurality of wireless field devices, but outside of said process control plant;

discovering in said host, the presence of said plurality of wireless field devices by communicating with said plurality of wireless field devices;

displaying a list of wireless field devices whose presence is discovered;

enabling a user to select a first wireless field device contained in said displayed list of wireless field devices;

causing said first wireless field device to generate a human perceivable signal by communication between said host device and said first wireless field device in response to said user selecting said first wireless field device, whereby said user correlates a wireless field device selected from said list of wireless field devices with said first wireless field device based on the specific wireless field device generating said human perceivable signal; and issuing from said host device a plurality of configuration commands on said wireless medium, wherein said configuration commands are designed to configure said first wireless field device upon receipt by said first wireless field device.

2. The method of claim 1, wherein said human perceivable signal is a visible signal.

3. A machine readable storage medium storing one or more sequences of instructions for causing a host device to configure a plurality of wireless field devices over a wireless medium for later use in a process control plant, wherein said host device is placed in a range of communication of said plurality of wireless field devices, but outside of operational environment of said process control plant, wherein said plurality of wireless field devices are also placed outside of said process control plant, wherein execution of said one or more sequences of instructions by one or more processors contained in said host device causes said host device to perform the actions of:

establishing communication with a first wireless field device on a wireless path provided on said wireless medium, said first wireless field device being contained in said plurality of wireless field devices;

discovering said first wireless field device by communicating with said first wireless field device on said wireless medium;

displaying a list of devices discovered by said discovering, said list of device including said first wireless field device;

enabling a user to select said first wireless field device in said list of devices; and sending a signal designed to cause only said first wireless field device to generate a human perceivable signal indicating that said first wireless field device has been selected for configuration; and issuing configuration commands on said wireless path to configure said first wireless field device, wherein said wireless path spans an entire path between said host device and the configured one of said at least one of said plurality of wireless field devices.

4. The machine readable storage medium of claim 3, wherein said establishing comprises:

sending a synchronization signal which enables said first wireless field device to synchronize its internal clock with a clock of said host device; and assigning a time slot for said first wireless field device to send signals to said host device, wherein a non-overlapping time slot is allocated to each discovered wireless field device such that each wireless field device can communicate with said host device in the allocated time slot.

5. The machine readable storage medium of claim 3, wherein said discovering comprises:

receiving an identifier which uniquely identifies said first wireless field device; and interfacing with said first wireless field device using said identifier to determine a type of said first wireless field device.

6. The machine readable storage medium of claim 3, wherein said human perceivable signal is a visible signal.

7. A host device designed to configure a plurality of wireless field devices for later use in a process control plant, each of said plurality of wireless field devices accessible by a wireless medium, said host device and said plurality of wireless field devices being outside of operation environment of said process control plant, said host device comprising:

a wireless interface; and a processor operable to:

establish communication with a first wireless field device on a wireless path provided on said wireless medium, said first wireless field device being contained in said plurality of wireless field devices;

discover said first wireless field device by communicating with said first wireless field device on said wireless medium;

display a list of devices discovered by said discovering, said list of device including said first wireless field device;

enable a user to select said first wireless field device in said list of devices; and send a signal designed to cause only said first wireless field device to generate a human perceivable signal indicating that said first wireless field device has been selected for configuration; and issue configuration commands on said wireless path to configure said first wireless field device, wherein said wireless path spans an entire path between said host device and the configured one of said at least one of said plurality of wireless field devices outside of operation environment of said process control plant.

8. The host device of claim 7 to establish said communication, said processor is operable to:

send a synchronization signal which enables said first wireless field device to synchronize its internal clock with a clock of said host device; and assign a time slot for said first wireless field device to send signals to said host device, wherein a non-overlapping time slot is allocated to each discovered wireless field device such that each wireless field device can communicate with said host device in the allocated time slot.

9. The host device of claim 8, wherein said processor is further operable to:

receive an identifier which uniquely identifies said first wireless field device; and interface with said first wireless field device using said identifier to determine a type of said first wireless field device.

10. The host device of claim 7, wherein said human perceivable signal is a visible signal.

11. A method of configuring a plurality of wireless field devices for later use in a process control plant, each of said plurality of wireless field devices accessible by a wireless medium, said method comprising:

placing a host device in a range of communication of said plurality of wireless field devices, but outside of operational environment of said process control plant;

discover in said host device, the present of said plurality of wireless devices by communicating with said plurality of host devices on said wireless medium;

send a synchronization signal which enables said first wireless field device to synchronize its internal clock with a clock of said host device;

assign a time slot for said first wireless field device to send signals to said host device, and causing said host device to issue a plurality of configuration commands on a wireless path provided on said wireless medium, wherein said configuration commands are designed to configure at least one of said plurality of wireless field devices upon receipt by said at least one of said plurality of wireless field devices, wherein said wireless path spans an entire path between said host device and the configured one of said at least one of said plurality of wireless field devices, wherein a non-overlapping time slot is allocated to each discovered wireless field device such that each wireless field device can communicate with said host device in the allocated time slot.

12. The method of claim 11, wherein said host device is designed to display a list of wireless field devices whose presence is discovered.

13. The method of claim 12, further comprising:

enabling a user to select a first wireless field device contained in said displayed list of wireless field devices, said enabling being done before said configuring, said enabling causing said host device to cause said first wireless field device to generate a human perceivable signal, whereby said user correlates a wireless field device selected from said list of wireless field devices with said first wireless field device based on the specific wireless field device generating said human perceivable signal.

* * * * *